US006970170B2

(12) United States Patent
Slavin

(10) Patent No.: US 6,970,170 B2
(45) Date of Patent: Nov. 29, 2005

(54) GRAPHICS RESAMPLING SYSTEM AND METHOD FOR USE THEREOF

(75) Inventor: Keith R. Slavin, Beaverton, OR (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 10/869,554

(22) Filed: Jun. 15, 2004

(65) Prior Publication Data

US 2004/0222991 A1 Nov. 11, 2004

Related U.S. Application Data

(63) Continuation of application No. 09/944,937, filed on Aug. 30, 2001, now Pat. No. 6,765,578.

(51) Int. Cl.[7] .............................................. G06T 11/00
(52) U.S. Cl. ...................... 345/472; 345/660; 345/671; 382/298
(58) Field of Search ................................ 345/472, 660, 345/670, 671, 419, 427; 382/298, 299, 300

(56) References Cited

U.S. PATENT DOCUMENTS

| | | | | |
|---|---|---|---|---|
| 4,282,546 | A | | 8/1981 | Reitmeier ..................... 358/22 |
| 4,578,812 | A | | 3/1986 | Yui .............................. 382/41 |
| 4,630,307 | A | | 12/1986 | Cok ............................. 382/25 |
| 5,054,100 | A | | 10/1991 | Tai .............................. 382/47 |
| 5,703,965 | A | | 12/1997 | Fu et al. ..................... 382/232 |
| 5,889,894 | A | | 3/1999 | Ito et al. ..................... 382/300 |
| 5,930,407 | A | | 7/1999 | Jensen ........................ 382/300 |
| 5,991,752 | A | * | 11/1999 | Fukuda et al. .................. 707/1 |
| 5,995,682 | A | | 11/1999 | Pawlicki et al. ............. 382/300 |
| 6,002,810 | A | * | 12/1999 | Wakisawa et al. .......... 382/298 |
| 6,018,597 | A | | 1/2000 | Maltsev et al. ............. 382/260 |
| 6,424,753 | B1 | | 7/2002 | Yamaguchi ................. 382/300 |
| 6,445,731 | B1 | | 9/2002 | Yamano et al. ............. 375/222 |
| 6,501,441 | B1 | * | 12/2002 | Ludtke et al. ............... 345/1.1 |
| 6,535,651 | B1 | | 3/2003 | Aoyama et al. ............ 382/300 |
| 6,573,940 | B1 | | 6/2003 | Yang ........................... 348/441 |
| 6,727,908 | B1 | * | 4/2004 | Wright et al. ............... 345/606 |

OTHER PUBLICATIONS

Catmull, E. et al., "A Class of Local Interpolating Splines", Computer Aided Geometric Design, New York, Academic Press, 1974, pp. 317-326.
Hill, F.S., Jr., "Computer Graphics Using Open GL", New Jersey, Prentice-Hall, 2001, pp. 643-653.
Kochanek, D. et al., "Interpolating Splines with Local Tension, Continuity, and Bias Control", Computer Graphics, vol. 18, No. 13, Jul. 1984. pp. 33-41.
Webb, J.L.H., "Transposed FIR Filter Structure with Time-Varying Coefficients for Digital Data Resampling", IEEE Transactions on Signal Processing, vol. 48, No. 9, Sep. 2000. pp. 2594-2600.

* cited by examiner

*Primary Examiner*—Kee M. Tung
*Assistant Examiner*—Mackly Monestime
(74) *Attorney, Agent, or Firm*—Dorsey & Whitney LLP

(57) ABSTRACT

A resampling circuit and method where input sample values for samples arranged along a row of a source image are received by a row resampling circuit. The row resampling circuit calculates row output values which are provided to a column resampling circuit that calculates output sample values therefrom. The column resampling circuit includes a shift register that receives the row output values and shifts the row output values through the shift register as the row output samples are calculated. The shift register has a plurality of evenly spaced sample output terminals from which the row output values are sampled by an interpolation circuit for calculation of the output sample values.

21 Claims, 4 Drawing Sheets

GRAPHICS RESAMPLING SYSTEM AND METHOD FOR USE THEREOF

CROSS-REFERENCE TO RELATED APPLICATION

This application is a continuation of U.S. patent application Ser. No. 09/944,937, filed Aug. 30, 2001 now U. S. Pat. No. 6,765,578.

TECHNICAL FIELD

The present invention is related generally to the field of computer graphics, and more particularly, a system and method for resampling graphics data of a source image to produce graphics data for a destination image.

BACKGROUND OF THE INVENTION

As display devices of various sizes and increased resolution have been developed and the demand for them have increased, the ability for a graphics processing system to resize and resample source images and create destination images to take advantage of the various sized and higher resolution displays is a desirable operation. In an electronic display system, color at each pixel is represented by a set of color components, and each color component is represented by a sample value. Color components such as red, green, blue (RGB) or other representations such as $YC_bC_r$ are well known in the art. Whichever representation is chosen, each color component can be interpreted as a two dimensional array of samples, so three such arrays can represent images on display systems. Conceptually, resampling can be viewed as a spatial process, working on discrete input samples, represented by pixels of the source image arranged in a two-dimensional bitmap. The output samples of the destination image are spatially located at fractional sample positions within the input sample grid. Various interpolation and modeling methods are used to construct transition models between samples of the source image from which additional graphics data is produced during the resampling operation.

The additional graphics data is then used to produce larger or higher resolution destination graphics images. However, the resulting destination image must retain an acceptable image quality with respect to the source image. That is, the destination image should appear to retain at least a similar visual qualities of the source image, such as having nearly the same color balance, contrast, and brightness as the original source image. Otherwise, rather than accurately reproducing a larger or higher resolution graphics image of the source image, the resampling operation will compromise image quality by introducing image distortion. To this end, various resampling algorithms have been developed in order to create high quality destination graphics images.

With many conventional resampling algorithms, a transition model between input samples along each axis is constructed to provide output sample values. Generally good results can be obtained with separable processing along each axis for graphics images because image feature cross-sections have the same characteristics when viewed at any angle within the image plane, only at different effective sample rates. That is, the resampling operation is first performed on the pixels along a first axis of the source image followed by resampling of the pixels along the other axis. The output sample values of the resampling operation along the first axis is then used in generating the transition models from which output samples are calculated. The transition models between the input samples are constructed such that the output samples interpolated from the transition model create a destination image that closely resembles the original or source image. The transition models are typically continuous so that an output sample can be generated at any position between the input samples.

A typical axis separable resampling circuit performs the resampling operation for the source image along one axis in its entirety before beginning the resampling operation along the second axis. In operation, input samples of a source image are scanned in using a row-by-row access and provided to a resampling circuit. The output sample values calculated by the resampling circuit are written to a memory from which the output sample values are accessed when performing the resampling operation along the other axis. The resulting output samples are then written to a display memory from which the data for a destination image are read for rendering. Although conceptually the simplest, it is not a very efficient manner in which to perform resampling. One reason is related to the manner in which a memory device is accessed. The x- and y-axes of the source image correspond to the row and columns of a memory device. Accessing the data for y-axis resampling is ordinarily not efficient because new row and column addresses must be provided for reading or writing of data. In contrast, accessing input samples along a row of the source image, and consequently a row of memory, can take advantage of page or burst access features of the memory device. These features typically require providing the column address for access along a row, or in some instances, simply strobing a single command signal is all that is necessary to increment the column address once a row address is provided.

In another resampling circuit, resampling is again performed along the x-axis first, and subsequently followed by resampling along the y-axis. However, rather than accessing the graphics data in the inefficient manner previously described, the resampling circuit includes a plurality of series connected delay buffers having equal lengths that are sufficient to accommodate an entire row of input samples of the source image. The number of delay buffers depends on the number of samples used to interpolate a new sample along the y-axis. Rows of the stored graphics data from the x-axis resampling operation are read into and shifted through the delay buffers, thus allowing for a page or burst mode to be used. Circuitry for performing the interpolation along the y-axis is coupled to the series of delay buffers such that there is a tap at the input of the first delay buffer, and taps at the output of each delay buffer to provide synchronized access to the data used in the y-resampling operation. As the data continues to shift through the delay buffers, the synchronization is maintained. As a result, the graphics data used to obtain the sample history needed for model generation along the y-axis is available to the interpolation circuitry without the access latency present in the previously described conventional resampling process.

In cases where the source image is scaled by {Rx, Ry} to increase image size along the x- and y-axes, respectively, the quantity of intermediate data generated by the resampling circuit along the x-axis is approximately equal to (Rx x source_width), where source_width is the width of the source image. Thus, if generating and evaluating interpolation models along the y-axis requires a history of Ny samples, then a total of (Ny- 1) delays, each delay having a length of (Rx_max x source_width_max), where Rx_max is the maximum scaling ratio accommodated by the resampling circuit and source_width_max is the maximum width of a source image resampled by the resampling circuit. As one could imagine, the space occupied by the delays necessary for resampling along the y-axis is considerable. Moreover, the scaling ratio and size of the source image are limited by the widths of the delays in the conventional resampling circuit.

Therefore, there is a need for a flexible graphics resampling system and method that can accommodate a variety of different sized source images and various scaling ratios.

SUMMARY OF THE INVENTION

The present invention relates to a system and method for calculating output sample values from input sample values of a source image. The resampling circuit includes a row resampling circuit that receives input sample values for samples arranged along a row of a source image. The row resampling circuit calculates row output values and provides them to a column resampling circuit for calculation of output sample values from the resampled row output values. The columns are narrower than the image width. The column resampling circuit includes a shift register that receives the row output values and shifts the row output values through the shift register as the row output samples are calculated. The shift register further having a plurality of evenly spaced sample output terminals from which the row output values are sampled in a synchronized fashion by an interpolation circuit for the output sample value calculation. As columns do not correspond to the image width, pixels are not processed in display scanning order, so this approach is applied to memory-to-memory processing only.

DETAILED DESCRIPTION OF THE INVENTION

Embodiments of the present invention are directed to a system and method for resampling graphics data of a source image and for providing graphics data generated therefrom for rendering a scaled destination image. Certain details are set forth below to provide a sufficient understanding of the invention. However, it will be clear to one skilled in the art that the invention may be practiced without these particular details. In other instances, well-known circuits, control signals, timing protocols, and software operations have not been shown in detail in order to avoid unnecessarily obscuring the invention.

Figure 1:
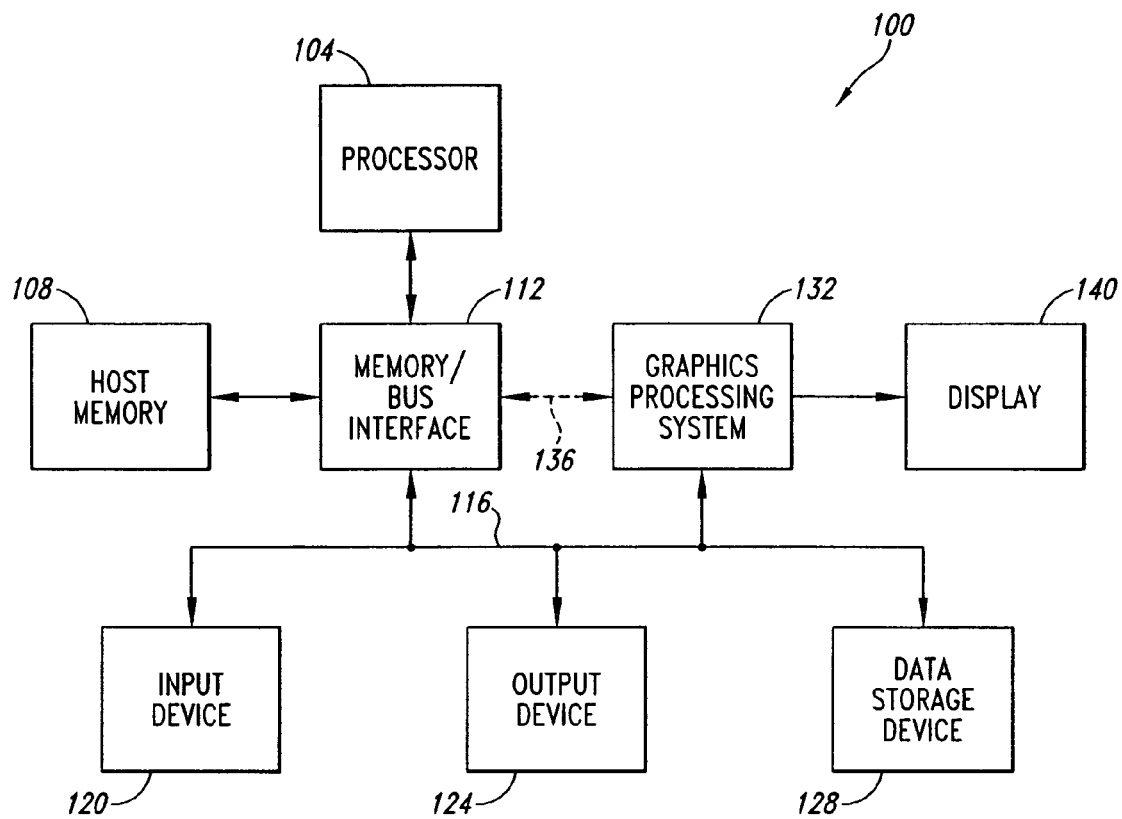
FIG. 1 is a block diagram of a computer system in which embodiments of the present invention are implemented.

FIG. 1 illustrates a computer system 100 in which embodiments of the present invention are implemented. The computer system 100 includes a processor 104 coupled to a host memory 108 through a memory/bus interface 112. The memory/bus interface 112 is coupled to an expansion bus 116, such as an industry standard architecture (ISA) bus or a peripheral component interconnect (PCI) bus. The computer system 100 also includes one or more input devices 120, such as a keypad or a mouse, coupled to the processor 104 through the expansion bus 116 and the memory/bus interface 112. The input devices 120 allow an operator or an electronic device to input data to the computer system 100. One or more output devices 120 are coupled to the processor 104 to provide output data generated by the processor 104. The output devices 124 are coupled to the processor 104 through the expansion bus 116 and memory/bus interface 112. Examples of output devices 124 include printers and a sound card driving audio speakers. One or more data storage devices 128 are coupled to the processor 104 through the memory/bus interface 112 and the expansion bus 116 to store data in, or retrieve data from, storage media (not shown). Examples of storage devices 128 and storage media include fixed disk drives, floppy disk drives, tape cassettes and compact-disc read-only memory drives.

The computer system 100 further includes a graphics processing system 132 coupled to the processor 104 through the expansion bus 116 and memory/bus interface 112. Optionally, the graphics processing system 132 may be coupled to the processor 104 and the host memory 108 through other types of architectures. For example, the graphics processing system 132 may be coupled through the memory/bus interface 112 and a high speed bus 136, such as an accelerated graphics port (AGP), to provide the graphics processing system 132 with direct memory access (DMA) to the host memory 108. That is, the high speed bus 136 and memory bus interface 112 allow the graphics processing system 132 to read and write host memory 108 without the intervention of the processor 104. Thus, data may be transferred to, and from, the host memory 108 at transfer rates much greater than over the expansion bus 116. A display 140 is coupled to the graphics processing system 132 to display graphics images. The display 140 may be any type of display, such as those commonly used for desktop computers, portable computers, and workstation or server applications, for example, a cathode ray tube (CRT), a field emission display (FED), a liquid crystal display (LCD), or the like.

Figure 2:
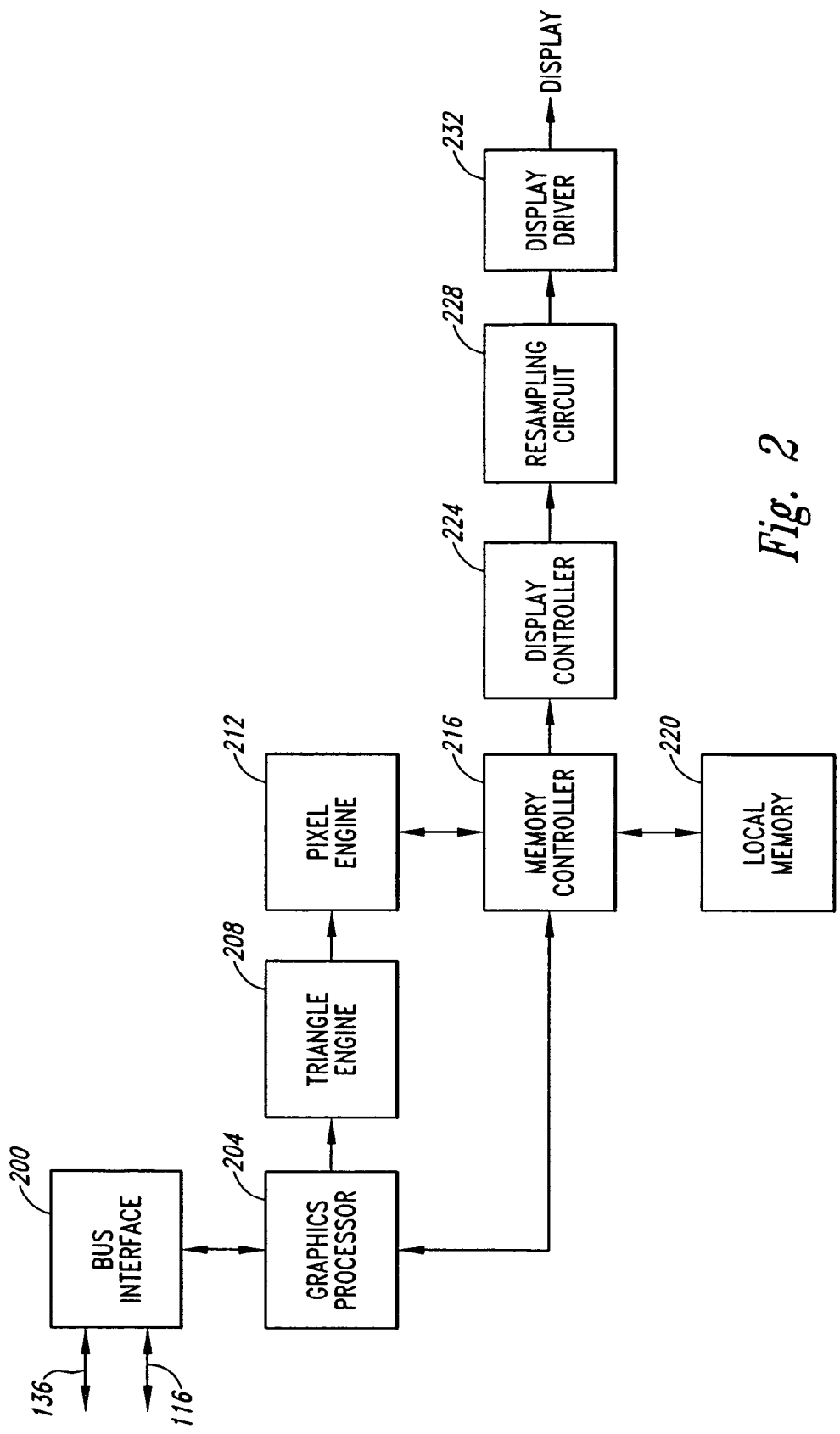
FIG. 2 is a block diagram of a graphics processing system in the computer system of FIG. 1.

FIG. 2 illustrates circuitry included within the graphics processing system 132 for performing various three-dimensional (3D) graphics functions. As shown in FIG. 2, a bus interface 200 couples the graphics processing system 132 to the expansion bus 116. In the case where the graphics processing system 132 is coupled to the processor 104 and the host memory 108 through the high speed data bus 136 and the memory/bus interface 112, the bus interface 200 will include a DMA controller (not shown) to coordinate transfer of data to and from the host memory 108 and the processor 104. A graphics processor 204 is coupled to the bus interface 200 and is designed to perform various graphics and video processing functions, such as, but not limited to, generating vertex data and performing vertex transformations for polygon graphics primitives that are used to model 3D objects. The graphics processor 204 is coupled to a triangle engine 208 that includes circuitry for performing various graphics functions, such as clipping, attribute transformations, rendering of graphics primitives, and generating texture coordinates for a texture map.

A pixel engine 212 is coupled to receive the graphics data generated by the triangle engine 208. The pixel engine 212 contains circuitry for performing various graphics functions, such as, but not limited to, texture application or mapping, bilinear filtering, fog, blending, and color space conversion.

A memory controller 216 coupled to the pixel engine 212 and the graphics processor 204 handles memory requests to and from an local memory 220. The local memory 220 stores graphics data, such as source pixel color values and destination pixel color values. A display controller 224 is coupled to the memory controller 216 to receive processed destination color values for pixels that are to be rendered. Coupled to the display controller 224 is a resampling circuit 228 that facilitates resizing or resampling graphics images. As will be explained below, embodiments of the resampling circuit 228 perform approximations that simplify the calculation of a model between two sample points for use during resampling. The output color values from the resampling circuit 228 are subsequently provided to a display driver 232 that includes circuitry to provide digital color signals, or convert digital color signals to red, green, and blue analog color signals, to drive the display 140 (FIG. 1).

Although the resampling circuit 228 is illustrated as being a separate circuit, it will be appreciated that the resampling circuit 228 may also be included in one of the aforementioned circuit blocks of the graphics processing system 132. For example, the resampling circuit 228 may be included in the graphics processor 204 or the display controller 224. In other embodiments, the resampling circuit 228 may be included in the display 140 (FIG. 1). Therefore, the particular location of the resampling circuit 228 is a detail that may be modified without deviating from the subject matter of the invention, and should not be used in limiting the scope of the present invention.

Figure 3:
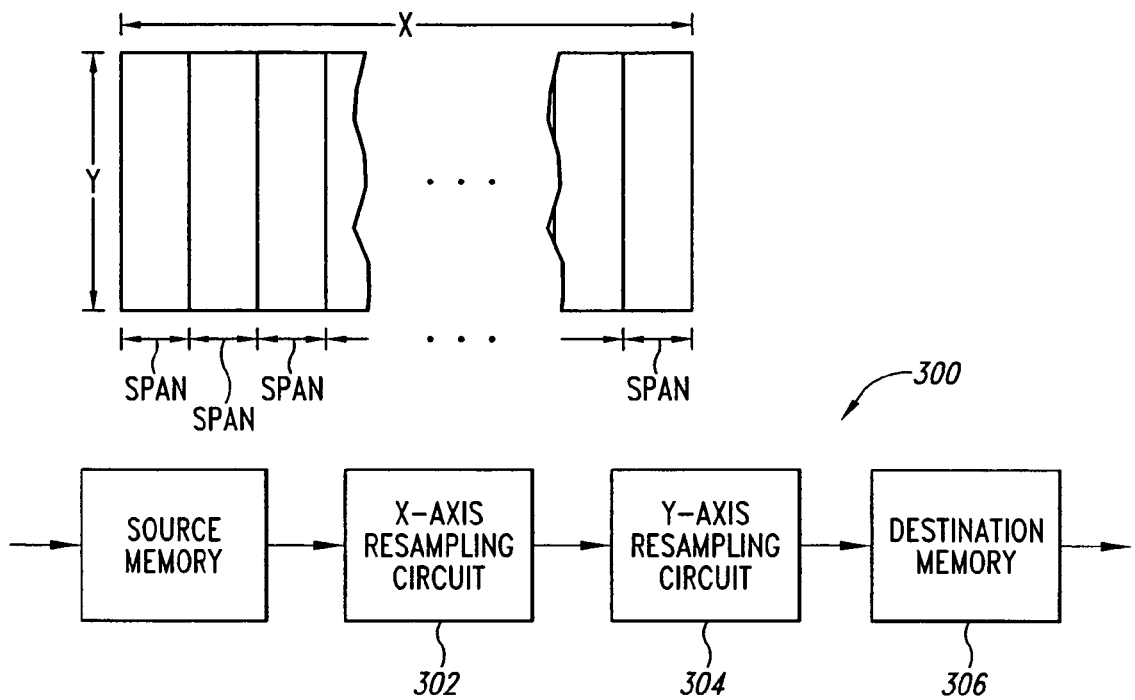
FIG. 3 is a block diagram of a resampling system in the graphics processing system of FIG. 2 according to an embodiment of the present invention.

FIG. 3 illustrates a resampling circuit 300 that may be substituted for the resampling circuit 228 shown in FIG. 2. The resampling circuit 300 includes an x-axis resampling circuit 302 and a y-axis resampling circuit 304 coupled in series to perform axis separable resampling. Connected to the input of the x-axis resampling circuit is a source data memory in which image data to be resampled is stored. Coupled to the output of the y-axis resampling circuit 304 is a destination data memory 306 into which the resampled data is temporarily stored prior to writing the resulting data to a display memory (not shown) or the like. The input and output memory may be the same. As will be discussed in more detail below, the resampling circuit 300 resamples graphics data or sample values of the pixels of a source image and generates graphics data for rendering a destination image.

The resampling circuit 300 samples the graphics data by scanning in "columns" of graphics data. That is, graphics data for pixels of the source image are sampled in a first direction, typically along a row, for a span of pixels. When the end of the span is reached, the graphics data for the next row is then sampled from the beginning of the length of the span. As a result, the source image is separated into columns of sampled graphics data having widths equal to the span of pixels. Scanning in this columnar fashion continues until the graphics data of the source image are completely read. As will be discussed in more detail below, the length of a span is related to the length of buffers in the y-axis resampling circuit 304.

While the graphics data are read, the resampling circuit 300 calculates graphics data for a destination image in accordance with a resampling or scaling ratio. The resampled graphics data for the destination image are typically calculated from an interpolation model that is generated from the pixel sample values of the source image. Consequently, graphics data for multiple pixels are used simultaneously for the model generation and sample value interpolation. The amount of graphics data generated by the resampling process depends on the scaling or resizing ratio. For example, if the source image is to be scaled to twice its size, while maintaining its aspect ratio (i.e., 2× along each axis), the resampling circuit 300 will then generate approximately four-times as much graphics data as that used to represent the source image. As previously discussed, because of the quantity of graphics data that must be generated for rescaling a source image, conventional resampling circuits may have limited scaling capabilities. However, as will be discussed in greater detail below, the resampling circuit 300 is capable of resampling at a variety of scaling or resizing ratios.

The resampling circuit 300 can also perform resampling operations for large scaling ratios by performing consecutive resampling operations until the graphics data for the scaling ratio is achieved. For example, if a source image is to be scaled by 5:1 ratio, the resampling operation can be performed by first performing a 1.25:1 resampling operation, followed by a 4:1 resampling operation on the graphics data from the initial resampling operation. This flexibility is possible if the source and destination memories are the same physical memory. The memory should be able to service the input/output data bandwidth required for all passes. The resulting graphics data is used for the 5:1 destination image. In performing consecutive resampling operations, the resampling operation for the lower scaling ratio should be performed initially because the amount of graphics data resampled in a subsequent resampling operation is reduced, and consequently, will yield a more efficient overall resampling process. It will be appreciated that multiple consecutive resampling operations can be performed to yield very large scaling ratios. For example, scaling a source image by a 100:1 ratio can be performed by first by a 100:64 resampling operation, followed by three consecutive 4:1 resampling operations.

It will be appreciated that the sample values for the samples may consist of several different components. For example, the sample value may represent pixel colors which are the combination of red, green, and blue color components. Another example includes sample values representing pixel colors which are the combination of luma and chroma components. Consequently, because it is well understood in the art, although circuitry to perform graphics operation for each of the components is not expressly shown or described herein, embodiments of the present invention include circuitry, control signals, and the like necessary to perform resampling operations on each component for multi-component sample values. Moreover, it will be appreciated that embodiments of the present invention further include the circuitry, control signals, and the like necessary to perform axis separable resampling operations for graphics data represented in multiple axes. Implementation of axis separable resampling is well understood in the art, and a more detailed description of such has been omitted from herein to avoid unnecessarily obscuring the present invention.

Figure 4:
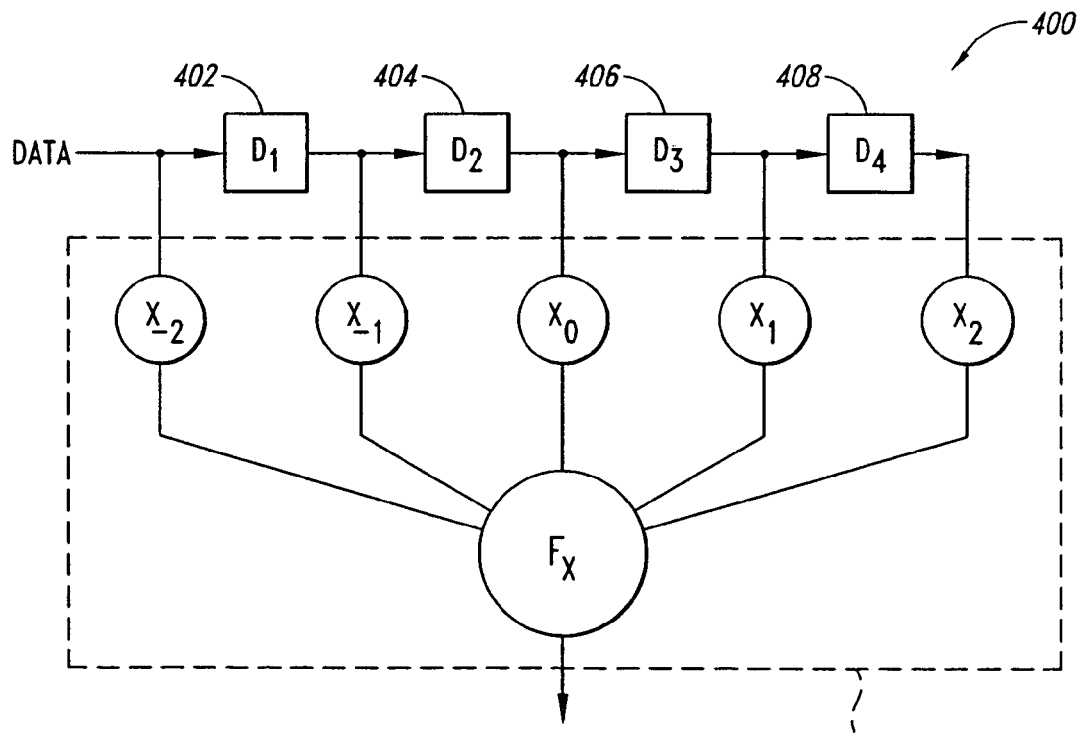
FIG. 4 is a block diagram of a resampling circuit according to an embodiment of the present invention that may be used in the resampling system of FIG. 3.

FIG. 4 illustrates an x-axis resampling circuit 400 according to an embodiment of the present invention. Graphics data of the pixels of the source image are provided to the x-axis resampling circuit 400 and through a series of x-sample buffers 402–408 coupled in series. Each of the x-sample buffers 402–408 is of sufficient width to accommodate the graphics data for one pixel. The x-sample buffers 402–408 may be implemented using conventional data buffer circuits and techniques, such as using static random access memory (SRAM) devices, conventional shift registers, or the like.

An x-interpolation circuit 416 is coupled to the input of the first x-sample buffer 402 and the output of the x-sample buffers 402–408. Graphics data is sampled by the x-interpolation circuit 416 and used to generate a model from which resampled graphics data along the x-axis for the destination image are calculated. Since the x-sample buffers 402–408 are all of the same length, the graphics data for five pixels (i.e., $x_{-2}$, $x_{-1}$, $x_0$, $x_1$, and $x_2$) along a row of the source image are synchronized for sampling by the x-interpolation circuit 416. Thus, as the graphics data is shifted through the pipeline of x-sample buffers 402–408, a resampling algorithm can be performed to calculate resampled graphics data along the x-axis for a destination image from the multiple sample values provided at the input of the first x-sample buffer 402 and the output of each of the x-sample buffers 402–408.

In operation, the x-interpolation circuit 416 samples the graphics data along a row of pixels for a span of pixels and then returns to the beginning of the span on the next row to begin sampling again. Thus, only a portion of each row of pixels is sampled before sampling from the adjacent row. As will be explained in more detail below, the length of the span, or how many pixels are sampled before sampling begins at the next row, is a function of the scaling ratio and buffer length of the y-axis resampling circuit 304 (FIG. 3). As mentioned previously, the result is that the pixels of the source image are divided into columns of pixels, each column having a width equal to the span of pixels.

It will be appreciated that various well known algorithms can be used by the x-interpolation circuit 416 to generate graphics data for a destination image. For example, a cubic model can be used to generate a model between two sample points from which resampled graphics data may be interpolated. One such method is described in greater detail in co-pending U.S. patent application Ser. No. 09/760,173, entitled PIXEL RESAMPLING SYSTEM AND METHOD to Slavin, filed Jan. 12, 2001, which is incorporated herein by reference. In summary, the aforementioned patent application describes using a cubic model from which resampled graphics data can be calculated. The coefficients for the solution of the cubic model between two adjacent sample pixels are calculated by using the color values of the adjacent sample pixels and an estimated gradient value co-sited with the two sample pixels. Although the aforementioned algorithm may be used in embodiments of the present invention, it will be appreciated that other algorithms, now known or later developed, may also be used, and consequently, the scope of the present invention should not be limited by the particular interpolation algorithm applied by the x-interpolation circuit 416, except to the extent recited in the claims attached hereto.

It will be further appreciated that the number of samples used for the calculation of the destination graphics data will depend on several factors, one of which is the particular algorithm used for the interpolation model. Although FIG. 4 illustrates using five samples from the source image, greater or fewer samples may be used as well. Additionally, the interpolation circuits may use different algorithms for different types of graphics data, for example, a first algorithm for graphics data representing text and a second algorithm for graphics data representing video. Consequently, the particular number of samples provided to an interpolation circuit, or the number actually used can be modified without deviating from the scope of the present invention.

Following the resampling operation, the sample values of the source image, as well as the sample values calculated therefrom are provided by the x-interpolation circuit 416 to the y-axis resampling circuit 304 (FIG. 3). As previously discussed, the quantity of graphics data generated by the x-resampling circuit 400 will be dependent on the resampling or scaling ratio. In an axis separable resampling circuit, such as that described herein, the quantity of data is increased or decreased for each axis according to the resampling ratio along the particular axis. Thus, as previously mentioned, if a source image is to be doubled (i.e., the scaling ratio is 2×) along both axes, the x-resampling circuit 400 will provide approximately twice as much graphics data along the x-axis as in the source image. The quantity of graphics data along the y-axis (i.e., the number of lines) is not affected by the x-axis resampling.

Figure 5:
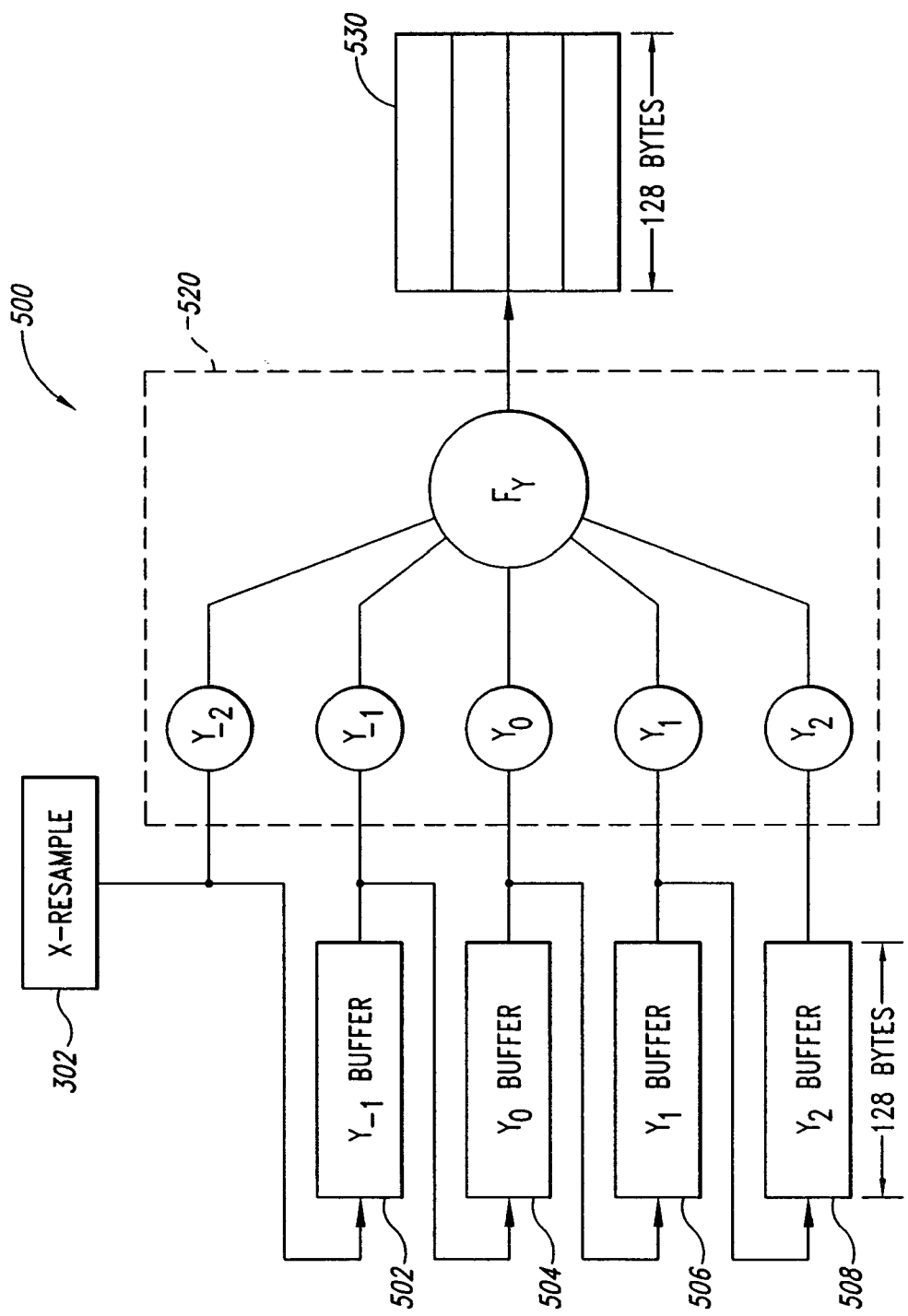
FIG. 5 is a block diagram of a resampling circuit according to another embodiment of the present invention that may be used in the resampling system of FIG. 3.

FIG. 5 illustrates a y-axis resampling circuit 500 according to an embodiment of the present invention. Graphics data for pixels of the source image, as well as graphics data calculated for the destination image are provided from a x-axis resampling circuit 302 to the y-resampling circuit 500. The data is shifted through a pipeline of y-sample buffers 502–508 coupled in series. A y-interpolation circuit 520 is coupled to the output of the of x-axis resampling circuit 302 and to the output of each of the y-sample buffers 502–508 to sample the graphics data.

Graphics data is sampled by the y-interpolation circuit 520 and used to calculate graphics data for the destination image. Since the y-sample buffers 502–508 are all of the same length, the graphics data sampled by the y-interpolation circuit 520 at a given moment are vertically aligned such that interpolation along the y-axis of the source image can be performed in a synchronized manner. Moreover, the vertical alignment of the graphics data is maintained as new graphics data provided by the x-axis resampling circuit 302 is shifted into the first y-sample buffer 502. Following calculation of the graphics data for the destination image, y-interpolation circuit 520 provides the data to a destination buffer 530 which temporarily stores the graphics data prior to being written to a display memory (not shown).

As shown in FIG. 5, the length of the y-sample buffers 502–508 are 128-bytes wide, however, this value has been selected by way of providing an example, and should not be interpreted as limiting the scope of the present invention. The length of the y-sample buffers generally have a length that is less than the width (x__max) of the source image. However, although data buffers of different lengths may be selected for the y-sample buffers 502–508, choosing a length that will take advantage of the access speed of the display memory to which destination data is written is desired.

As mentioned previously, the effect is that the graphics data of the source image is resampled in "columns" of data. The widths of the columns, or the span, of data will be a function of the desired scaling ratio and the width of the y-sample buffers 502–508. A larger scaling ratio along the x-axis will result in relatively narrower columns because the sum of the graphics data that generated from the x-axis resampling operation and the graphics data of the source image for one row of the source image must fit within the length of a y-sample buffer. In this manner, synchronized sampling by the y-interpolation circuit 520 can be maintained.

Thus, the span of the columns selected by the x-axis resampling circuit 302 (FIG. 3) is such that the sum of the sample values of the span and the resampled graphics data generated for the length of the span will occupy the length of one of the y-sample buffers of the y-axis resampling circuit 500. The use of smaller y-sample buffers, and consequently shorter span lengths, also allows large source images to be resampled by breaking the original source image into smaller manageable columns of graphics data. Limitations on scaling ratios or source image size are overcome by this approach since the resampling operation is performed for both the x- and y-directions on subsets of the graphics data of a source image rather than performing a resampling operation on the entire source image along one axis before resampling along the other axis, or performing resampling for the entire length of multiple rows of the source image before resampling along the other axis.

In operation, the y-interpolation circuit 520 samples the graphics data for five pixels of the source image. The five samples are taken from the source graphics data and calculated graphics data that are provided to a y-resampling circuit 500 from the x-axis resampling circuit 302. The graphics data is received into the pipeline of y-sample buffers 502–508 of the y-resampling circuit 500, and shifted through the y-sample buffers 502–508 such that the y-interpolation circuit 520 uses the sample values to calculate the graphics data for the destination image. The resulting destination graphics data is then provided to a destination buffer 530 and stored temporarily before being written to a memory (not shown). The graphics data is provided to the destination buffer 530 in a "vertical" orientation and then subsequently rewritten to the memory in a "horizontal" orientation for display.

It will be appreciated that in resampling the entire source image, the graphics data for the pixels along the edges of the columns will "overlap" in order for the resampling circuit 300 to have a sufficient number of samples when calculating resampled graphics data at the interface between adjacent columns of graphics data. The amount of overlap will depend on the interpolation model used by the y-interpolation circuit and the number of samples required to create the model. If the number of samples from a source column are too small, the extra work and memory access to load and process data twice (from input data overlaps near the column boundaries) may dominate, so the y-pipeline buffers should not be too short, nor should the x-upsampling ratio be too large.

From the foregoing it will be appreciated that, although specific embodiments of the invention have been described herein for purposes of illustration, various modifications may be made without deviating from the spirit and scope of the invention. Accordingly, the invention is not limited except as by the appended claims.

What is claimed is:

1. A method for calculating data for pixels of a destination image from data for pixels of a source image, the pixels of the source and destination images arranged in rows and columns along a first axis and a second axis, respectively, the method comprising:
    calculating a first set of data corresponding to pixels scaled along the first axis for a first portion of pixels of the destination image from the data for a plurality of pixels along the first axis for a first portion of pixels of the source image, the first portion of pixels of the source image arranged in spans and columns of pixels, the span of pixels less than the length of one row of pixels of the source image;
    calculating data corresponding to pixels scaled along the second axis for the first portion of pixels of the destination image from the first set of data;
    calculating a second set of data corresponding to pixels scaled along the first axis for a second portion of pixels of the destination image from the data for a plurality of pixels along the first axis for a second portion of pixels of the source image;
    calculating data corresponding to pixels scaled along the second axis for the second portion of pixels of the destination image from the second set of data; and
    including the data for the pixels scaled along the first and second axes for the first and second portions of pixels of the destination image as part of the data for the pixels of a final destination image.

2. The method of claim 1 wherein calculating the first set of data corresponding to pixels scaled along the first axis and calculating the second set of data corresponding to pixels scaled along the first axis comprises interpolating output values from a cubic model.

3. The method of claim 1 wherein calculating data corresponding to pixels scaled along the second axis for the first portion of pixels of the destination image comprises:
    buffering the data corresponding to a plurality of rows of pixels of the first portion of pixels of the destination image;
    sampling the data corresponding to vertically aligned pixels of the plurality of rows; and
    calculating data for pixels scaled along the second axis from the sampled data.

4. The method of claim 3 wherein buffering the data corresponding to a plurality of rows of pixels of the first portion of pixels of the destination image comprises shifting the data corresponding to the rows of pixels of the first portion of pixels of the destination image through a plurality of buffers having the same data length.

5. The method of claim 4 wherein the data corresponding to the plurality of rows of pixels of the first portion of pixels of the destination image comprises N rows and the plurality of buffers comprises N−1 buffers.

6. The method of claim 3 wherein calculating data corresponding to pixels scaled along the second axis for the second portion of pixels of the destination image comprises:
    buffering the data corresponding to a plurality of rows of pixels of the second portion of pixels of the destination image;
    sampling the data corresponding to vertically aligned pixels of the plurality of rows; and
    calculating data for pixels scaled along the second axis from the sampled data.

7. A method for calculating data corresponding to pixels of a destination image from data corresponding to pixels of a source image, the destination image a scaled version of the source image, the method comprising:
    calculating data corresponding to pixels of the destination image from data corresponding to pixels of the source image in groups of pixels of the source image, for each group of pixels of the source image,
        sampling along a first axis the data corresponding to a plurality of pixels;
        calculating intermediate data corresponding to pixels scaled along the first axis for a respective portion of the destination image from the sampled data of the plurality of pixels;
        sampling the intermediate data along a second axis perpendicular to the first axis; and
        calculating final data corresponding to pixels scaled along the second axis for the respective portion of the destination image; and
    combining the final data calculated from each group of pixels of the source image into data for the destination image.

8. The method of claim 7 wherein calculating intermediate data corresponding to pixels scaled along the first axis for a respective portion of the destination image comprises interpolating output values from a cubic model.

9. The method of claim 7 wherein sampling the intermediate data along a second axis perpendicular to the first axis comprises:
buffering the intermediate data corresponding to pixels scaled along the first axis; and
sampling the buffered intermediate data corresponding to vertically aligned pixels of the respective portion of the destination image.

10. The method of claim 9 wherein buffering the intermediate data corresponding to pixels scaled along the first axis comprises shifting the intermediate data through a plurality of series coupled buffers having the same data length.

11. The method of claim 7 the groups of pixels of the source image are arranged in spans and columns of pixels, the span of pixels of a group less than the length of one row of pixels of the source image.

12. A method for scaling a source image into a destination image, the source image having a plurality of pixels arranged in rows and columns along a first axis and a second axis, respectively, the method comprising:
scaling along the first axis the pixels for a first portion of pixels of the source image;
scaling along the second axis the scaled pixels of the first portion of pixels;
scaling along the first axis the pixels for a second portion of pixels of the source image, the first and second portions of pixels of the source image arranged in spans and columns of pixels, the span of pixels less than the length of one row of pixels of the source image;
scaling along the second axis the scaled pixels of the second portion of pixels; and
including the scaled pixels of the first and second portions of pixels in a destination image corresponding to a scaled version of the source image.

13. The method of claim 12 wherein scaling along the first axis the pixels for the first portion of pixels of the source image comprises
sampling along the first axis data corresponding to a plurality of pixels; and
calculating data for the pixels of a portion of the destination image from the sampled data, the calculated data corresponding to pixels of the destination image scaled along the first axis.

14. The method of claim 13 wherein scaling along the second axis the scaled pixels of the first portion of pixels comprises:
sampling along the second axis the calculated data corresponding to pixels scaled along the first axis; and
calculating data corresponding to pixels of the destination image scaled along the second axis from the sampled data.

15. The method of claim 14 wherein calculating data corresponding to pixels of the destination image scaled along the second axis from the sampled data comprises:
buffering the data corresponding to pixels of the destination image scaled along the first axis;
sampling the buffered data corresponding to vertically aligned pixels of the destination image; and
calculating data for pixels scaled along the second axis from the sampled buffered data.

16. The method of claim 15 wherein buffering the data corresponding to pixels of the destination image scaled along the first axis comprises shifting the data through a plurality of series coupled buffers having the same data length.

17. A method for scaling a source image, the method comprising:
dividing pixels of the source image into a plurality of groups of pixels, the groups of pixels arranged in spans and columns of pixels, the span of pixels less than the length of a row of pixels of the source image;
for each group of pixels, scaling the pixels along a first axis and scaling the scaled pixels along a second axis;
combining the scaled pixels of each of the plurality of groups of pixels to form a destination image that is a scaled version of the source image.

18. The method of claim 17 wherein scaling the pixels along the first axis comprises:
sampling along the first axis data corresponding to a plurality of pixels of a group of pixels of the source image; and
calculating data for the pixels of a portion of the destination image from the sampled data, the calculated data corresponding to pixels of the destination image scaled along the first axis.

19. The method of claim 18 wherein calculating data for the pixels of a portion of the destination image from the sampled data comprises interpolating output values from a cubic model.

20. The method of claim 18 wherein scaling the scaled pixels along the second axis comprises:
buffering the data corresponding to pixels of the portion of the destination image scaled along the first axis;
sampling the buffered data corresponding to vertically aligned pixels of the portion of the destination image; and
calculating data corresponding to pixels scaled along the second axis from the sampled buffered data.

21. The method of claim 20 wherein buffering the data corresponding to pixels of the portion of the destination image scaled along the first axis comprises shifting the data through a plurality of series coupled buffers having the same data length.

* * * * *